United States Patent [19]

Scholle

[11] 4,160,309

[45] Jul. 10, 1979

[54] METHOD AND APPARATUS FOR MAKING BATTERY GRIDS

[75] Inventor: William R. Scholle, Corona del Mar, Calif.

[73] Assignee: Scholle Corporation, Northlake, Ill.

[21] Appl. No.: 817,701

[22] Filed: Jul. 21, 1977

Related U.S. Application Data

[62] Division of Ser. No. 762,756, Jan. 26, 1977, Pat. No. 4,091,192.

[51] Int. Cl.² .......................... B29C 5/00; B23P 13/00
[52] U.S. Cl. .......................................... 29/2; 425/562; 425/572; 425/129 R; 425/130; 29/527.3; 29/527.6; 164/DIG. 1; 264/138; 264/255; 264/328; 264/272
[58] Field of Search ................... 164/98, 332, DIG. 1; 425/130, 562, 572, 129 R; 29/527.3, 527.5, 2; 264/138, 255, 271, 250, 221, 317, 294, 272, 157, 328; 429/209, 233, 234, 241-245

[56] References Cited

U.S. PATENT DOCUMENTS

| 3,599,290 | 8/1971 | Garner | 425/562 |
| 3,738,871 | 6/1973 | Scholle | 429/241 |
| 3,761,218 | 9/1973 | Portalier | 425/562 |
| 3,793,410 | 2/1974 | Garner | 264/250 |
| 3,859,134 | 1/1975 | Shirodker | 429/234 |
| 3,956,012 | 5/1976 | Scholle | 429/234 |
| 3,957,278 | 5/1976 | Rabe | 277/227 |

FOREIGN PATENT DOCUMENTS

1316124 5/1973 United Kingdom ..................... 429/234

Primary Examiner—W. E. Hoag
Attorney, Agent, or Firm—Gary, Juettner & Pyle

[57] ABSTRACT

An apparatus for making a battery grid is characterized by a molding die for molding a lead conductor with a plastics frame. The die has runners or channels defining the grid structure, and valves are positioned at the intersections of the channels for the lead conductor and the channels for the plastics frame. The valves are actuable to selectively block the channels for the plastics frame from the channels for the conductor. In the use of the die to form a battery grid, with the valves actuated to block the channels for plastics from the channels for lead, molten lead is injected into the channels therefor and is confined therein to form the conductor. The valves are then actuated to unblock the channels for plastics and hardenable plastics are injected therein to form the plastics frame, with the frame being molded around the conductor at intersections therewith.

19 Claims, 6 Drawing Figures

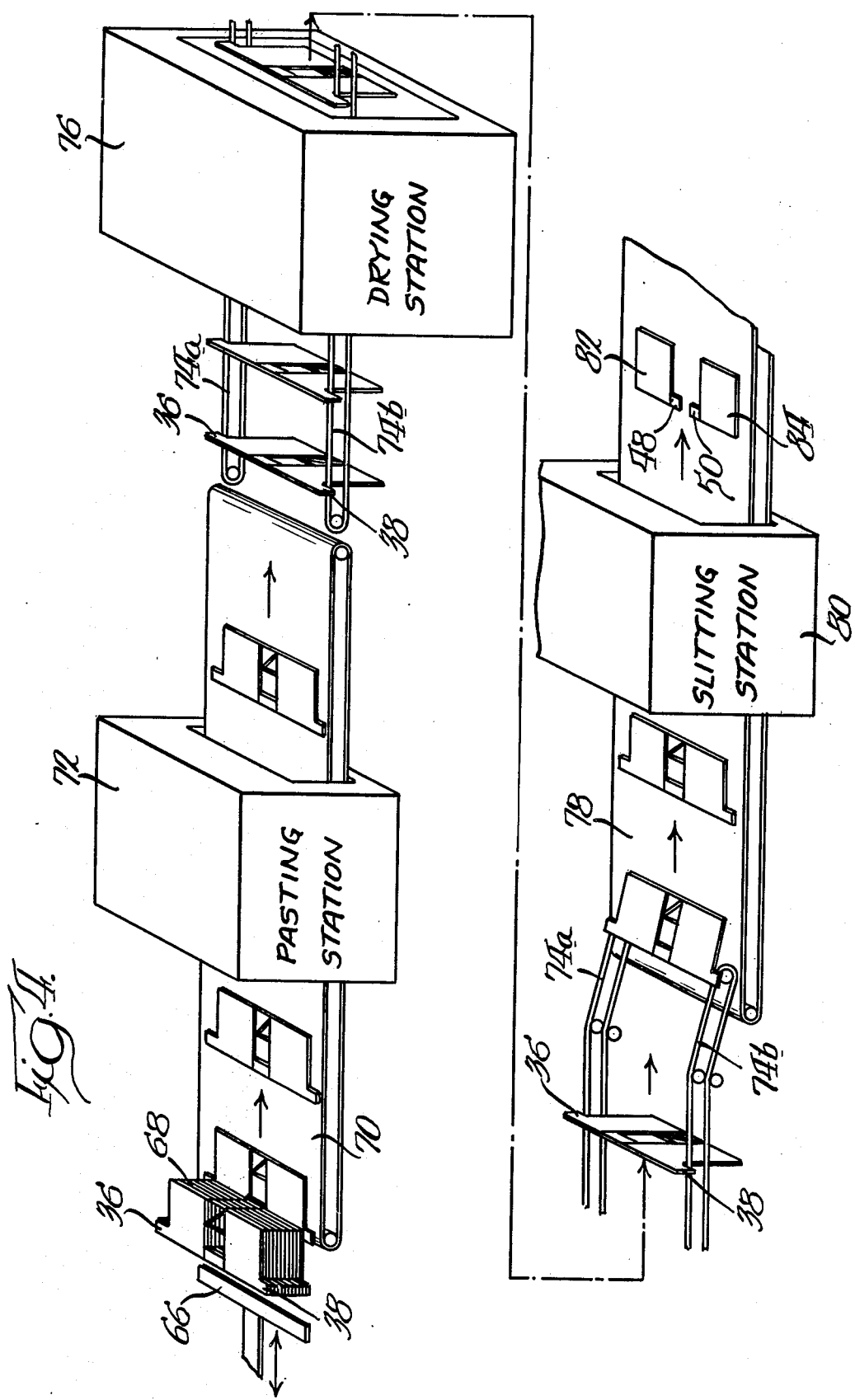

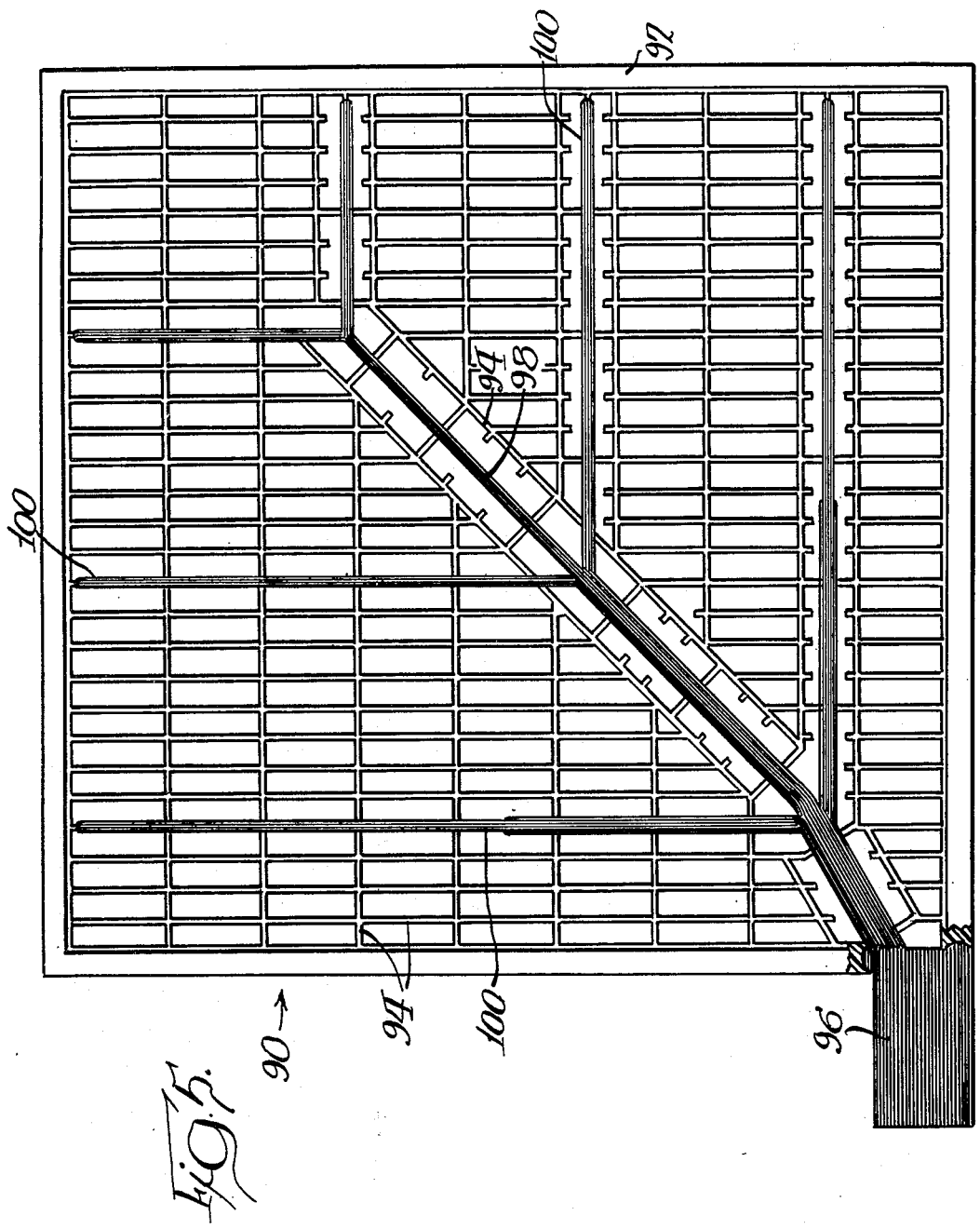

METHOD AND APPARATUS FOR MAKING BATTERY GRIDS

This is a division of application Ser. No. 762,756, filed Jan. 26, 1977, now U.S. Pat. No. 4,091,192.

BACKGROUND OF THE INVENTION

The present invention relates to a method of and apparatus for making battery grids, and in particular to an improved method and apparatus for manufacturing battery grids in a single molding die.

Present day battery grids are often made of plastics material which acts as a mechanical frame to hold lead oxide paste, and are provided with a conductor for contacting the paste. Such grids frequently are used in automobile batteries, and when pasted are called battery plates. Lead is commonly used as the conductor since it is relatively insoluble in sulfuric acid which serves as the electrolyte, and is normally alloyed with calcium or antimony for rigidity, as pure lead is relatively soft. Other metals that are good conductors, such as copper, are soluble in sulfuric acid and would poison a lead acid battery.

As is well known, the grid generally comprises a rectangular frame formed with rectangular openings and a laterally projecting lead lug on its periphery, connected to the conductor, by means of which a plurality of grids of similar polarity may be fused together or otherwise electrically connected in parallel as by a bar leading to a battery post.

Normally, the plastics grid with conductor and lead lug is further manufactured by pasting the individual grids with a paste of lead oxide containing some sulfuric acid. These pasted grids are then dried and later subjected to an electrical charge while in sulfuric acid, whereby one group of plates called the negative plates have their lead oxide converted to lead, and another group of plates called the positive plates have their lead oxide converted to lead dioxide. A series of plates is then placed in a cell with alternating negative and positive plates and with a separator between each plate of, for example, fluted wood, perforated rubber, or the like. The battery is then filled with a dilute solution of sulfuric acid.

A cell may comprise any number of plates, with the positive plates being connected in parallel and the negative plates being connected in parallel, so that the entire cell has a desired amperage rating. In a lead oxide battery, the cell typically exhibits a voltage of approximately 2.1 volts, and depending on the desired voltage of the battery the requisite number of cells are connected in series, for example 6 cells connected in series for a 12-volt battery.

In the manufacture of battery grids, various techniques have heretofore been sued to form the conductor on the plastics lattice or frame. For example, the plastic frame and a lead grid in the shape of the conductor may separately be made, and the grid set into recesses formed in the frame to define the conductor. Or the lead grid may directly be embedded into the plastics frame in a molding process or, conversely, the frame may be joined with the lead grid by laminating, inserting or other means. Any of these previous manufacturing techniques require several separate and distinct steps for implementation, and therefore are time consuming and costly.

Once a battery grid is fabricated, the aforementioned further manufacturing thereof to produce a battery plate is ordinarily performed by automatic process. The grid is transported sequentially through various stations whereat operations performed thereon (i.e. pasting, drying, etc.) result in the battery plate. To facilitate support of the grids during transport, the grids often are formed in pairs joined by severable plastics legs, with the lead lugs of the grids extending outward from opposite sides of the pair. The grids are then supported by the lead lugs during transport between and through the manufacturing stations. Unfortunately, the lead lugs are relatively soft, and may deform in supporting the grids, particularly when the weight of the lead oxide paste is added thereto. Further, where the lugs are formed by extrusion, their positioning on opposite sides of the pair of grids requires lengthy sprues, so that a significant amount of lead remains in the sprues which must be broken off, remelted and reused.

OBJECTS OF THE INVENTION

A primary object of the present invention is to provide an improved method of and apparatus for molding lead and plastics battery grids in a single molding die.

Another object of the invention is to provide such a method and apparatus for making battery grids, wherein a plastics frame of the grid is molded around a lead conductor of the same to surround the conductor at intersections therewith.

SUMMARY OF THE INVENTION

In accordance with the present invention, an apparatus for making a structure of at least two intersecting moldable materials includes an injection molding die having a separate set of runners or channels therein for each material. Valves are provided at the intersections of the channels of each set, and are selectively actuable to block the channel of one set from the channel of the other. Thus, with the valves actuated to block the channels of one set from the other, a first one of the moldable materials may be injected into the one set of channels to form a portion of the structure. Then, with the valves opening the one set of channels to the other, another one of the moldable materials may be injected into the other set of channels to form the remainder of the structure and to surround the first material at intersections therewith.

The apparatus preferably is for making a battery grid structure of a type having a lead conductor supported by a plastics frame. In this case, the one set of channels define the lead conductor, and with the other set of channels blocked therefrom molten lead may be injected into the one set to form the conductor. Thereafter, with the valves actuated to open the one set of channels to the other, hardenable plastics may be injected into the other set to form the frame and to surround the lead conductor at intersections therewith.

In accordance with one method of making the battery grid structure, the lead conductor is integrally molded, and the plastics frame is then integrally molded to surround the conductor at intersections therewith.

In a preferred method of making the battery grid structure, the grid is die cast-injection molded in the molding die having the channels defining the structure. The method comprises blocking first those channels in the die defining the integral plastics member from those defining the lead conductor. Molten lead is then injected into the channels defining the lead conductor, and allowed to solidify. The previously blocked runners are then unblocked, and hardenable plastics is injected therein to form the integral plastics frame around the conductor.

The invention thus provides an apparatus for and method of molding battery grid structures in a single injection molding die in a process which lends itself to automatic control for economical mass production of the structures.

Other objects, advantages and features of the invention will become apparent from the following detailed description thereof, when taken in conjunction with the accompanying drawings.

BRIEF DESCRIPTION OF THE DRAWINGS

FIG. 4 is a diagrammatic showing of apparatus and steps used in manufacturing the battery grids of the invention into battery plates, particularly illustrating the utility of the plastics lugs on the battery grids in supporting paired grids for transport between sequential manufacturing operatins, and FIG. 5 is a plan view of a single battery grid of the lead-plastics type, structured in accordance with another embodiment of the invention, and may also be considered a cross-sectional view of a die cast injection mold showing channels therein for molding the grid.

DETAILED DESCRIPTION

Figure 1:
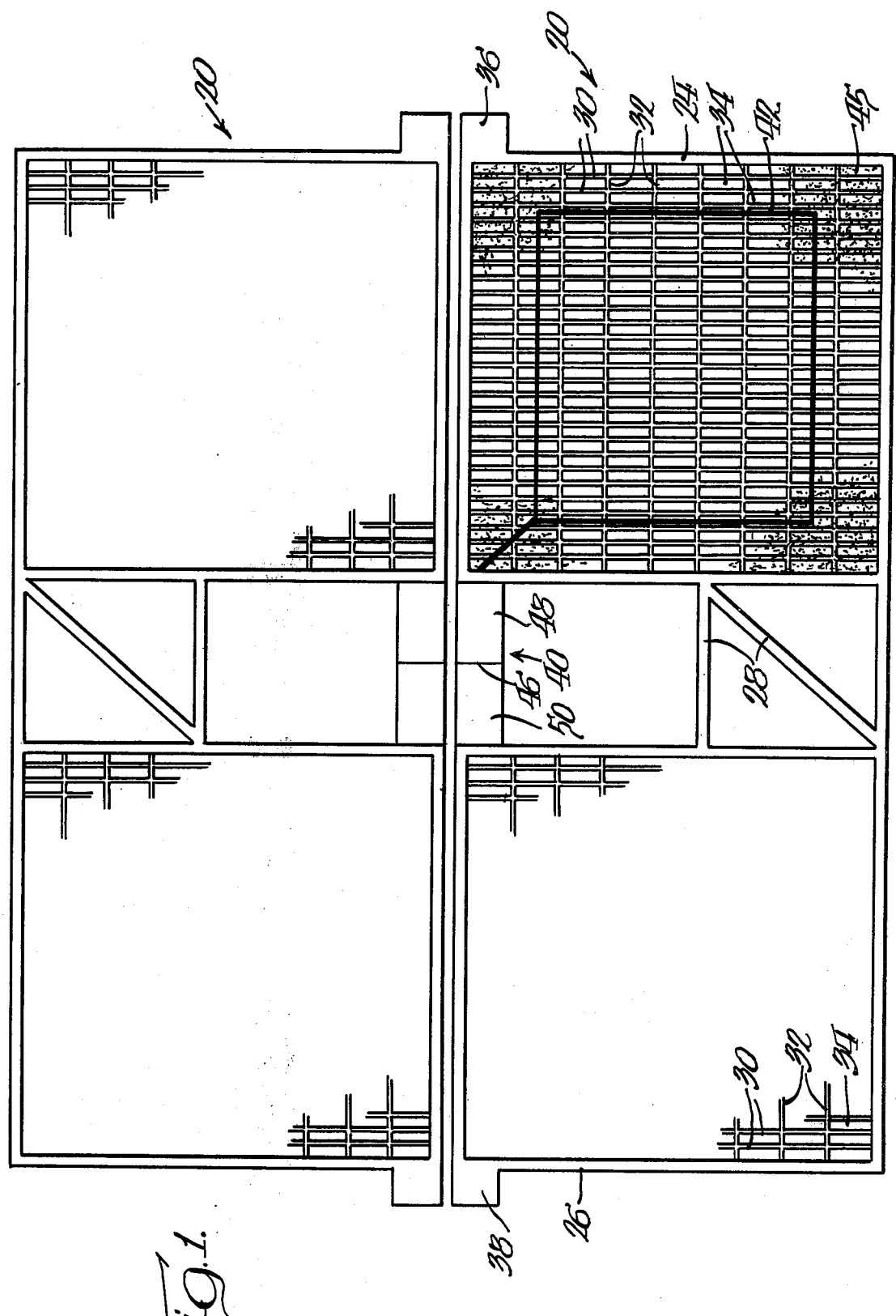
FIG. 1 is a plan view of two joined pairs of battery grids of the composite lead-plastics type, structure in accordance with one embodiment of the invention, and may also be considered a cross-sectional view of a die cast injection mold showing runners or channels therein for molding the battery grid structures.

Referring to FIG. 1 of the drawings, there are shown two identical paired battery grids, each indicated generally at 20, structured in accordance with one embodiment of the invention. With reference only to the lower paired grids, it being understood that a like description applies to the identical upper grids, the grids include an integral plastics member having a pair of rectangular frames 24 and 26 joined in a spaced side by side relationship as by a plurality of severable braces or legs 28 extending between facing inner sides of the frames. Each frame has a gridwork or latticework formed within a central open area thereof by a plurality of intersecting vertical components 30 and horizontal components 32, which together define a plurality of rectangular apertures 34. The frames also include respective plastics lugs 36 and 38 extending peripherally from opposite outer sides thereof.

A lead lug, indicated generally at 40, extends between facing sides of the frames, and individual lead conductors 42 of generally rectangular shape are supported by the latticework in each of the frames, and are each connected with a respective opposite end of the lead lug. In the practice of the invention the lead lug and the conductors are integrally formed, the lead lug is molded at each of its ends within the frames, and the conductors are molded within the vertical and horizontal components defining the latticeworks, as will be described.

The plastics lugs 36 and 38 are for supporting the paired battery grids during transport between subsequent manufacturing operations wherein, for example, the apertures 34 are filled with lead oxide paste 45 as is conventional, and the paired grids are otherwise manufactured into battery plates. When such manufacturing is completed, the plastics lugs and the braces 28 are severed from the frames, and the lead lug is severed at its center, as along a score line 46, to form two separate battery plates for use in a lead-acid battery. Each battery plate then has an individual lead lug 48 and 50, which may be electrically connected with the lugs of other plates of like polarity to form a cell of the battery. The cell is customarily filled with dilute sulfuric acid as an electrolyte, and to this end the plastics material of the frames should not only be acid resistant, but should also be sufficiently rigid to be able to support the lead oxide as initially pasted thereon or as subsequently converted by charging or discharging. A particularly suitable plastics is polystyrene, others being polyethylene, polyproplene, polycarbonates and acrylates.

The paired battery grids 20 are preferably die cast-injection molded in a single molding die having runners or channels for forming both the integral plastics member and the integral lead lug and conductors. Such a molding die, if shown in cross-section through the channels, would appear the same as the paired grids 20 of FIG. 1 except, of course, without the paste 45. Accordingly, there is no need to separately illustrate the molding die, since such would be redundant to FIG. 1. As the paired grids include two integral components, one of lead and one of plastics, such a molding die need have only two points of injection, for example an injection point for the lead in the channel for the lug 40, and an injection point for the plastics in the channel for one of the braces 28.

Figure 2:
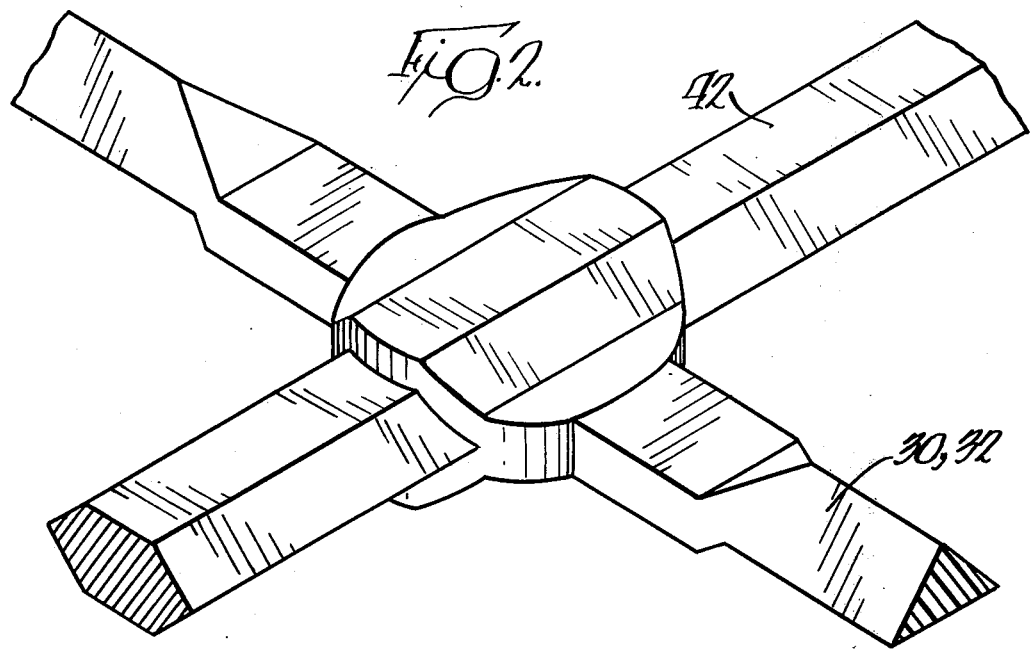
FIG. 2 is a perspective view of an intersection of lead and plastics in the battery grid structure.
Figure 3A:
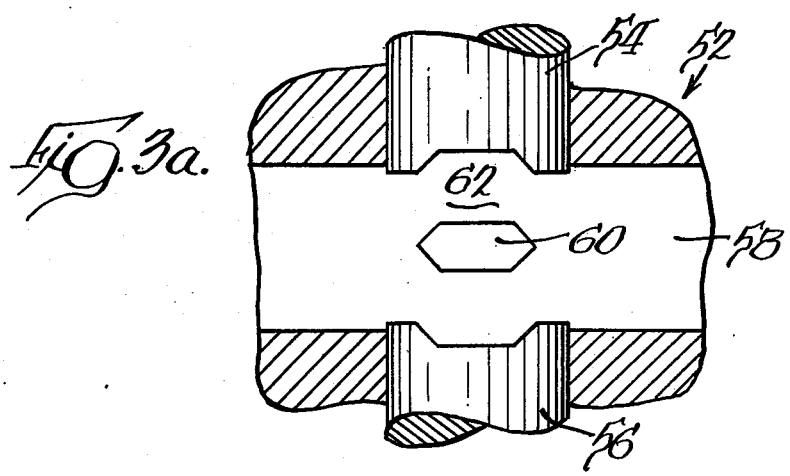
FIG. 3a is a cross-sectional view of a valve in the channels in the die at an intersection of lead and plastics, showing the valve in an open position.
Figure 3B:
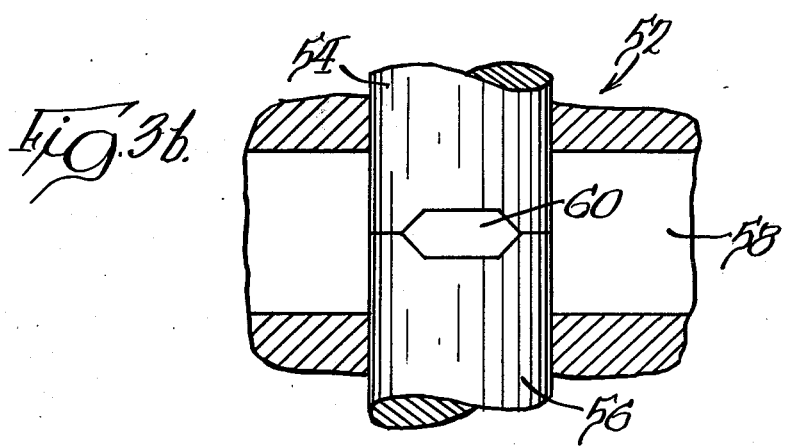
FIG. 3b is similar to FIG. 3a, and shows the valve in a closed position to seal the plastics channel from the lead channel.

Referring also to FIGS. 2 and 3, to mold the two discrete components of lead and plastics within the same molding die, so that as shown in FIG. 2 the lead conductors 42 are molded within a vertical or horizontal plastics component 30 or 32 at each intersection therewith, the die includes a respective valve means, indicated generally at 52, at each of the junction points between the plastics and the lead conductors, for example at each of the junctures between the lead conductors and a vertical or horizontal plastics component 30 or 32. Each valve means includes an upper valve pin 54 and a lower valve pin 56, which are simultaneously movable into or out of a juncture between a plastics channel 58 and a lead channel 60 in the die to open the plastics channel to the lead channel when in their outward position, as shown in FIG. 3a, or to close the plastics runner or channel to the lead runner or channel when in their inward position, as shown in FIG. 3b.

In molding the paired grids, the pins 54 and 56 are first moved to their inward position, and lead heated to a molten state is injected into the channels therefor in the die to form the integral lead lug and conductors. During this lead injection step, the valve pins effectively confine the lead to the channels therefor, and preclude entry of lead into the channels for the plastics. After injection of the lead, a refrigerant is preferably used to cool the lead as quickly as possible, during which time the valve pins are retracted. After the lead has solidified, but while still hot, molten hardenable plastics is injected into the channels therefor in the die to form the integral plastics member. During injection of the plastics the retracted valve pins, with reference to FIG. 3a, form a chamber 62 around the lead component at each of the intersections of a plastics channel therewith, whereby the plastics flows around the lead to mold or embed the lead therewithin. After the plastics has solidified and cooled, the grids are removed from the die for the aforementioned subsequent manufacturing.

It can now be appreciated that the paired battery grid structure offers significant economies in its manufacture and use. The relatively rigid outwardly extending plastics lugs 36 and 38 provide firm support for transport of the paired grids through subsequent operations, which support function is conventionally accomplished by forming the relative soft and bendable lead lugs 48 and 50 to extend peripherally outwardly from the grids. Further, the use of plastics lugs permits the lead lugs to be formed integrally together between the grids, enabling use of a single lead injection point in the die with attendant short sprue length, thus minimizing the amount of lead subsequently required to be removed from the sprue.

Also, pure lead, which is too soft and flexible to be used in a grid by itself or to be handled separately, becomes entirely functional in the injection molding process of the invention and when stiffened by plastics, thereby eliminating use of such materials as antimony and calcium in stiffening the lead, these materials not only being expensive, but costly to incorporate with the lead and to control. Elimination of the alloy system beneficially eliminates battery self-discharge, thereby allowing manufacture of essentially maintenance free batteries.

Additional economies may be realized by simultaneously molding in the same die two paired battery grids, as shown in FIG. 1. In this case, the die is configured to form the lead lug of each of the paired grids adjacent to one another to minimize sprue lengths. Of course, additional similar pairs of paired grids could, as desired, also be formed in the same molding die, such as four or eight paired grids.

The particular use of the plastics lugs 36 and 38 in supporting the grids during transport between successive manufacturing operations can be appreciated by reference to FIG. 4, wherein is shown diagrammatically a typical sequence of manufacturing operations. The sequence begins with an indexing mechanism 66 which sequentially moves individual ones of paired battery grids from a stack 68 thereof onto a conveyor 70. Instead of the mechanism 66, the grids could just as readily be positioned on the conveyor by a transfer wheel (not shown) having spaced pairs of teeth on its periphery for engaging the plastics lugs of successive grids and for transferring the grids to the conveyor. The conveyor then moves the grids through a pasting station 72 whereat a lead oxide paste is applied to the latticework areas thereof.

After pasting, the grids are transferred from the conveyor 70 to a pair of spaced conveyors 74a and 74b, which support the grids therebetween by means of the tabs 36 and 38, and move the grids through a drying station 76 for drying the lead oxide paste thereon. To this end, it is appreciated that the plastics lugs are sufficiently rigid to securely support, without deformation or breaking, the now paste laden grids.

After drying, the grids are transferred from the conveyors 74a and 74b to a more rapidly moving conveyor 78, which carries the paired grids through a slitting station 80 whereat the plastics lugs 36 and 38, and the legs 28, are severed therefrom, and whereat the lead lug 40 is severed along the slit line 46. As the grids exit from the slitting station they then comprise a pair of completed battery plates 82 and 84, ready for assembly in a battery.

Referring to FIG. 5, there is shown a structure for the individual battery grids of FIG. 1 in accordance with another embodiment of the invention. The battery grid, indicated generally at 90', is similar to the individual grids of FIG. 1 to the extent that it includes an integral plastics member having a rectangular frame 92 with a latticework formed therein by components 94, and a lead lug 96 extending peripherally from the frame. The structure differs from that in FIG. 1, however, by the lead conductor supported on the latticework, which is configured to improve the electrical contact made thereby with the lead oxide paste. In this case, the conductor includes a trunk portion 98 running diagonally across the grid and in contact with the lead lug, and a plurality of branch portions 100 extending outward therefrom. The particular configuration of the conductor increases the contact area with the paste, and provides for more uniform contact with the paste to decrease the resistance to a flow of current therethrough, whereby the efficiency and capacity of a battery manufactured with such grids is increased.

The invention thus provides unique paired battery grid structures formed with removable means for securely supporting the structures during subsequent manufacture thereof, and an economical and improve method of making the same.

While particular embodiments of the invention have been described in detail, it is understood that various modifications and other embodiments thereof may be devised by one skilled in the art without departing from the spirit and the scope of the invention, as defined by the appended claims.

What is claimed is:

1. A method for making a paired battery grid structure, comprising molding a lead lug with integral lead conductors extending from opposite ends thereof, and molding an integral plastics member around said lead lug and said conductors, said member being formed of a pair of side-by-side rectangular frames each with a latticework of intersecting components in a center area thereof, a severable leg extending between facing sides of said frames securing said frames in said side-by-side relationship, and a pair of severable lugs each extending peripherally outward from a respective outer side of each of said frames opposite from said facing sides, said plastics molding step including molding said latticeworks to surround with said components thereof a respective one of said lead conductors, and molding facing sides of each of said frames to surround a respective opposite end of said lead lug, said severable plastics lugs being formed with sufficient rigidity to support said grid structure therebetween, whereby two separate battery grids are obtainable by severing said plastics lugs and leg from said frames, and severing said lead lug centrally thereof.

2. A method as set forth in claim 1, wherein said paired battery grid structure is die cast and injection molded in a single molding die having channels defining said lead lug with associated conductors and said integral plastics member, wherein said molding steps include injecting molten lead into the channels in said die which define said lead lug and said lead conductors, and thereafter injecting hardenable plastics into the channels in said die which define said integral plastics member.

3. A method as set forth in claim 1, wherein said paired battery grid structure is die cast and injection molded in a single molding die having channels defining said paired battery grid structure, wherein said molding steps include blocking the channels in said die which define said integral plastics member from the channels which define said lead lug and conductors; injecting molten lead into the channels defining said lead lug and conductors; unblocking the previously blocked channels, and injecting hardenable plastics into the channels in the die defining the integral plastics member to form said member within said channels and around said lead lug and conductors.

4. A method as in claim 3, wherein said molding die has valves at intersections of the channels defining said integral plastics member and the channels defining said lead lug and conductors, said blocking step comprising operating the valves to close the channels for said plastics member from the channels for said lead lug and conductors at the intersections, said unblocking step comprising operating the valves to open the channels for said plastics member to the channels for said lead lug and conductors at the intersections.

5. A method as in claim 3, including the step of cooling said injected lead in the channels therefor prior to unblocking the previously blocked channels.

6. A method for making a battery grid structure, comprising molding a lead lug with an integral lead conductor extending therefrom, and molding an integral plastics member around said lug and conductor, said member including a frame molded on a side thereof around said lug with said lug extending peripherally from said frame, and a grid of intersecting perpendicular components in a center area of said frame with said components molded around said conductor to embed said conductor therein, said battery grid structure being die cast and injection molded in a single die having channels formed therein defining said battery grid structure, wherein said molding steps include injecting molten lead into the channels in said die which define said lead lug and conductor, and thereafter injecting hardenable plastics into the channels in said die which define said integral plastics member, while said lead remains where it was cast.

7. A method for making a battery grid structure, molding a lead lug with an integral lead conductor extending therefrom, and molding an integral plastics member around said lug and conductor, said member including a frame molded on a side thereof around said lug with said lug extending peripherally from said frame, and a grid of intersecting perpendicular components in a center area of said frame with said components molded around said conductor to embed said conductor therein, said battery grid structure being die cast and injection molded in a single molding die having channels formed therein defining said battery grid structure, wherein said molding steps include blocking the channels in said die which define said integral plastics member from the channels which define said lead lug and conductor, injecting molten lead into the channels defining said lead lug and conductor, cooling said lead injected into said lead channels while simultaneously unblocking the previously blocked channels for plastics, and injecting hardenable plastics into the channels in the die defining the integral plastics member to form said member within said channels and around said lead lug and conductor.

8. A method for making a battery grid structure, comprising molding a lead lug with an integral lead conductor extending therefrom, and molding an integral plastics member around said lug and conductor, said member including a frame molded on a side thereof around said lug with said lug extending peripherally from said frame and a grid of intersecting perpendicular components in a center area of said frame with said components molded around said conductor to embed said conductor therein, said molding including casting said lead lug and conductor and injection molding said plastics member around said lead lug and conductor, said casting and said molding steps being performed in a single die having a first set of channels therein defining said lead lug and conductor and a second set of channels defining said plastics member, the first and second sets of channels having points of intersection and the die having valves at the intersections selectively operable to block the channels of the second set from the channels of the first set, wherein said molding steps include operating the valves to block the channels of the second set from the channels of the first set; injecting molten lead into the channels of the first set to form said lead lug and conductor therein; operating the valves to open the channels of the second set to the channels of the first set, and injecting hardenable plastics into the channels of the second set to form said plastics member therein and around said lead at the intersections therewith.

9. A method as in claim 8, including the step of cooling said lead injected into said first set of channels while simultaneously operating the valves to open the channels of the second set of the channels of the first set.

10. A method for die casting and injection molding in a single molding die a structure comprised of at least two discrete moldable materials, the molding die having a separate set of channels therein for each discrete material, the separate sets of channels having at least one point of intersection, comprising the steps of blocking at each intersection a channel of one set from a channel of another; injecting into the channels of the other set a first one of the moldable materials; unblocking at each intersection the channel of the one set from the channel of the other, and injecting into the channels of the one set and around said first one of said moldable materials at said at least one intersection another one of the moldable materials.

11. A method as in claim 10, the molding die having a valve at each intersection of the sets of channels, the step of blocking comprising operating each said valve to close the channel of the one set from the channel of the other set at each intersection, the step of unblocking comprising operating each said valve to open the channel of the one set to the channel of the other at each intersection.

12. A method as in claim 11, wherein at least said first one of said materials is heated for injection into the other set of channels, the step of cooling said first material while simultaneously operating each said valve to open the channels of the one set to the channels of the other.

13. An apparatus for molding a structure consisting of at least two discrete moldable and hardenable materials, comprising a molding die having a separate set of channels therein for each discrete material, said channels together defining said structure, said sets of channels having at least one point of intersection; means at each intersection for blocking a channel of one set from a channel of another, and means for introducing into each set of channels a separate one of the materials, said blocking means being adapted to provide, in a first position, an aperture in said intersection through which only a first one of said materials can flow, and being movable to a second position at which said blocking means partially defines a flow channel about a hardened portion of said first material in said intersection, whereby with a channel of one set blocked from a channel of the other set at each intersection one of the materials may be introduced into the channels of the other set, and thereafter with the channel of the one set unblocked from the channel of the other set at each intersection another one of the materials may be introduced into the channels of the one set and around the one material at each intersection thereof.

14. An apparatus as in claim 13, said means for blocking including valve means at each intersection selectively operable to close the channel of the one set from the channel of the other or to open the channel of the one set to the channel of the other.

15. An injection molding die for making a battery grid having a lead lug with an integral lead conductor extending therefrom and a plastics member including a frame molded on a side thereof around the lug with the lug extending peripherally therefrom and a latticework in the center of the frame which intersects and is molded around the conductor, the molding die having a first set of channels therein defining the lead lug and conductor and a second set of channels defining the plastics member, said first and second sets of channels together defining the battery grid structure; means at each intersection of said channels of said first and second sets for selectively blocking the channel of said second set from the channel of said first set, and means for introducing molten lead into said first set of channels and hardenable plastics into said second set of channels, whereby with channels of said second set blocked from channels of said first set at each intersection molten lead introduced into said first set of channels is confined therein to form the lead lug and conductor, and thereafter with channels of said second set unblocked from channels of said first set at each intersection hardenable plastics introduced into said second set is molded around the lead lug and conductor and forms the plastics member.

16. An injection molding die as in claim 15, said means for selectively blocking including valve means at each said intersection, said valve means being actuable to selectively open or close the channel of said second set to or from the channel of said first set at each intersection.

17. An injection molding die as in claim 16, including means for cooling lead introduced into said first set of channels.

18. An injection molding die as in claim 16, said die having an enlarged chamber at each said intersection, said valve means when closing said second set of channels from said first set partially closing each said chamber to said first set of runners and providing a path substantially centrally therethrough for each channel of said first set, whereby molten lead introduced into said first set of channels does not completely fill each chamber, said valve means when opening said second set of channels to said first set opening the remainder of each said chamber to said second set of channels, whereby hardenable plastics introduced into said second set fills each chamber and surrounds the lead therein.

19. An injection molding die as in claim 18, said valve means at each said intersection comprising a pair of diametrically opposed valve pins movable towards each other into said chamber thereat and away from each other out of said chamber, said valve pins when together blocking passage of the channel of said second set through said chamber and defining at adjacent ends thereof a passage through said chamber for the channel of said first set, said valve pins when apart opening a passage through said chamber for the channel of said second set.

* * * * *